(12) United States Patent
Kim

(10) Patent No.: US 11,365,011 B2
(45) Date of Patent: Jun. 21, 2022

(54) METHOD OF CONTROLLING AUTONOMOUS ANTI-ICING APPARATUS

(71) Applicant: EGG CO., Ltd., Busan (KR)

(72) Inventor: Kukbin Kim, Busan (KR)

(73) Assignee: EGG CO., LTD., Busan (KR)

( * ) Notice: Subject to any disclaimer, the term of this patent is extended or adjusted under 35 U.S.C. 154(b) by 431 days.

(21) Appl. No.: 16/455,204

(22) Filed: Jun. 27, 2019

(65) Prior Publication Data

US 2020/0062409 A1 Feb. 27, 2020

(30) Foreign Application Priority Data

Aug. 24, 2018 (KR) .................. 10-2018-0098980

(51) Int. Cl.
| | |
|---|---|
| *B64D 15/20* | (2006.01) |
| *B64D 15/22* | (2006.01) |
| *B64D 15/12* | (2006.01) |
| *G05D 23/30* | (2006.01) |
| *G06F 17/11* | (2006.01) |

(52) U.S. Cl.
CPC ............. *B64D 15/22* (2013.01); *B64D 15/12* (2013.01); *G05D 23/303* (2013.01); *G06F 17/11* (2013.01); *H05B 2214/02* (2013.01)

(58) Field of Classification Search
CPC ..... B64D 15/20; B64D 15/22; H05B 2214/02
See application file for complete search history.

(56) References Cited

U.S. PATENT DOCUMENTS

| | | | | |
|---|---|---|---|---|
| 9,945,664 | B2* | 4/2018 | Walter | G01B 21/22 |
| 10,232,949 | B2* | 3/2019 | English | B64D 15/20 |
| 10,737,793 | B2* | 8/2020 | Meis | B64D 15/22 |
| 2008/0257033 | A1* | 10/2008 | Roberts | B64D 15/20 |
| | | | | 73/170.26 |
| 2009/0306928 | A1* | 12/2009 | Battisti | F03D 80/40 |
| | | | | 702/136 |
| 2014/0263838 | A1* | 9/2014 | Snir | B64D 15/14 |
| | | | | 244/134 F |
| 2015/0336676 | A1* | 11/2015 | McCann | G08G 5/0039 |
| | | | | 701/3 |

(Continued)

FOREIGN PATENT DOCUMENTS

| | | | | |
|---|---|---|---|---|
| KR | 10-1409358 | | 6/2014 | |
| WO | WO-2018037002 A1 * | | 3/2018 | ........ H05B 47/115 |

*Primary Examiner* — Helena Kosanovic
*Assistant Examiner* — Lawrence H Samuels
(74) *Attorney, Agent, or Firm* — Kile Park Reed & Houtteman PLLC

(57) ABSTRACT

The method of controlling an autonomous anti-icing apparatus includes: a first step of collecting and storing ice formation environment data; a second step of calculating a calculated value of an aerodynamic parameter based on the ice formation environment data and the ice formation prediction data in real time to determine whether ice formation is present on a surface of the structure and calculating a degree of ice formation through the calculated value of the aerodynamic parameter; and a third step of allowing a calculation control unit to send a temperature control signal, which includes a heating period signal, to a power supply so that an electric heating part is heated when the ice formation is determined by comparing the degree of ice formation with a preset value.

4 Claims, 4 Drawing Sheets

(56) References Cited

U.S. PATENT DOCUMENTS

2016/0009400 A1\* 1/2016 English .................. B64D 15/20
  244/134 R
2016/0178364 A1\* 6/2016 Walter .................. G01P 13/025
  702/94
2017/0158336 A1\* 6/2017 Meis ...................... B64D 15/22

\* cited by examiner

METHOD OF CONTROLLING AUTONOMOUS ANTI-ICING APPARATUS

CROSS-REFERENCE TO RELATED APPLICATION

This application claims priority to and the benefit of Korean Patent Application No. 10-2018-98980, filed on Aug. 24, 2018, the disclosure of which is incorporated herein by reference in its entirety.

BACKGROUND

1. Field of the Invention

The present invention relates to a method of controlling an autonomous anti-icing apparatus, and more specifically, to a method of controlling an autonomous anti-icing apparatus which has improved ice formation detection accuracy and economic feasibility.

2. Discussion of Related Art

Generally, anti-icing systems are used for a technology that detects, prevents, and removes ice formation and is used in low-temperature extreme environments in industries such as shipbuilding and marine plant industries, aerospace industries, and the like.

In the industry of off-shore plants and shipbuilding of a ship for a low temperature or polar region, the anti-icing system is applied as a system that prevents performance degradation or a malfunction due to ice formation on main components or equipment of a ship and the like.

Further, the anti-icing systems may be installed for use in structures at various ice formation points, such as ships for frozen seas, offshore structures installed in low temperature extreme environments, airplanes, wings of unmanned aerial vehicles, blades of wind power generators, external walls or windows of high-rise buildings, or the like.

Further, a technology of the anti-icing systems may be classified into a technology that measures and detects ice formation or an ice formation ratio, a technology that removes ice formation when ice formation occurs or prevents ice formation, and a de-icing technology, In this case, the technology that measures and detects ice formation or an ice formation ratio refers to a technology that detects an ice formation phenomenon, such as frost, occurring on a surface of an object exposed to a specific environment. The technology that detects ice formation allows a physical sensor to directly detect whether ice formation occurs and measure a thickness or weight of ice formation and an ice formation value. Further, the technology that detects ice formation includes a technology that predicts an ice formation phenomenon according to an external environment condition such as a temperature of an object surface in addition to the temperature, humidity, wind speed, and pressure of the atmosphere.

A Method of Determining Critical Icing Geometry of Airfoil disclosed in Korean Registered Patent No. 10-1409358 includes a step (a) of calculating an ice formation geometry according to an airplane operation condition and an ice formation atmosphere condition using an ice formation computational fluid dynamics (CFD) code, a step (b) of extracting geometry parameters for the ice formation geometry calculated in the step (a) using the code that extracts ice formation geometry information, and a step (c) of detecting the ice formation geometry that produces relatively degraded aerodynamics characteristics by comparing the geometry parameters extracted in the step (b).

However, the conventional ice formation technology includes an algorithm for detecting ice formation which is formed in one way. Therefore, when an extreme measurement value or calculated value according to a temporarily caused external unexpected situation is applied, a determination result that is different from the actual environment may be calculated, and thus the ice formation technology has a problem of degraded accuracy.

Meanwhile, the anti-icing technology refers to a technology that prevents ice formation caused on a surface of an object and minimizes an ice formation phenomenon. In this case, the ice formation mechanism includes a case in which solid ice particles move to the surface of the object and ice is formed on the surface. Further, the ice formation mechanism includes a case in which super-cooled water droplets, which maintain a liquid state at a temperature that is less than or equal to a freezing point, collide with the surface of the object and are simultaneously solidified and frozen in a moment.

In order to remove ice formation, a hydrophobic coating technology, an icephobic coating technology, and the like are applied as a special coating processing technology that prevents water droplets from being easily attached to a surface of an object. The hydrophobic coating technology refers to a technology that prevents super-cooled water droplets and the like from being attached to a surface, minimizes the attachment of the super-cooled water droplets, and the icephobic coating technology refers to a technology that performs special coating to prevent ice particles from being easily attached to the surface of the object.

Further, the de-icing technology refers to a technology that directly removes ice formation from a surface of an object. For example, to remove ice formation on a surface of a wind power blade, a method of circulating air heated in the wind power blade is used. Further, lately, a heating method using carbon nanotube (CNT) coating is emerging as a de-icing technology in which a CNT heating sheet having semi-conductor properties is attached to a surface of an object and which uses electric energy.

However, since an electric heating method, such as a heating method using resistance, a heated air circulation method, and the like, consumes a great deal of energy due to high power consumption required for de-icing, economic feasibility is degraded.

SUMMARY OF THE INVENTION

The present invention is directed to a method of controlling an autonomous anti-icing apparatus which has improved ice formation detection accuracy and economic feasibility.

According to an aspect of the present invention, there is provided a method of controlling an autonomous anti-icing apparatus provided in a structure in an ice formation environment, which includes: a first step of collecting and storing ice formation environment data, which includes information on an air speed, an angular speed, an angle, and aerodynamic load for an ice formation environment, using a plurality of sensing units, which are provided in the structure, in real time and storing ice formation prediction data including an aerodynamic coefficient; a second step of calculating a calculated value of an aerodynamic parameter based on the ice formation environment data and the ice formation prediction data in real time so as to determine whether ice formation is present on a surface of the structure and calculating a degree of ice formation through the calculated value of the aerodynamic parameter; and a third step of allowing a calculation control unit to send a temperature period signal, which includes a heating period signal, to a power supply so that an electric heating part is heated when the ice formation is determined by comparing the degree of ice formation with a preset value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a method of controlling an autonomous anti-icing apparatus according to an exemplary embodiment of the present invention will be described with reference to the accompanying drawings in detail.

Figure 1:
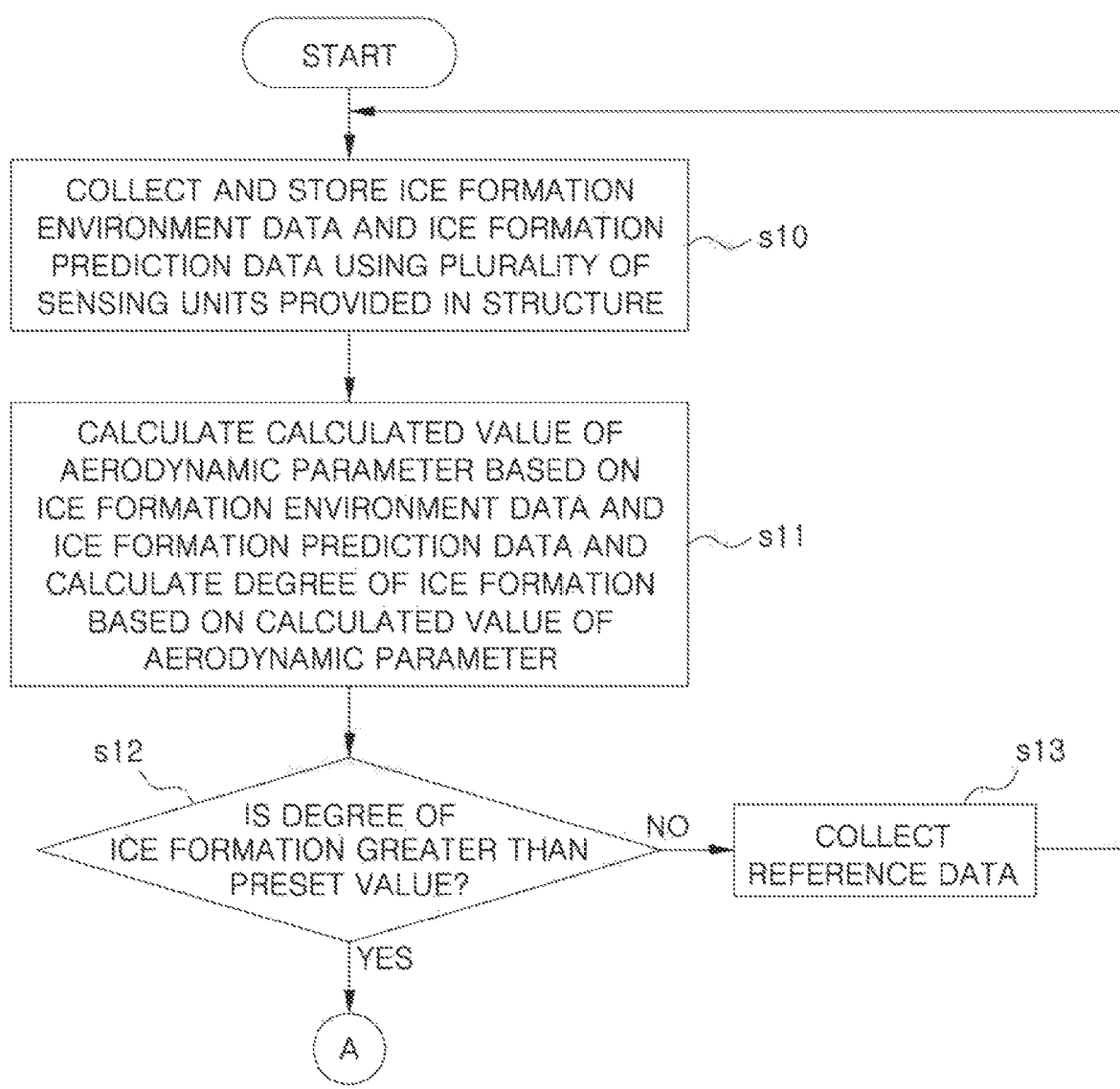
FIGS. 1 to 3 are flowcharts showing a method of controlling an autonomous anti-icing apparatus according to one embodiment of the present invention.
Figure 2:
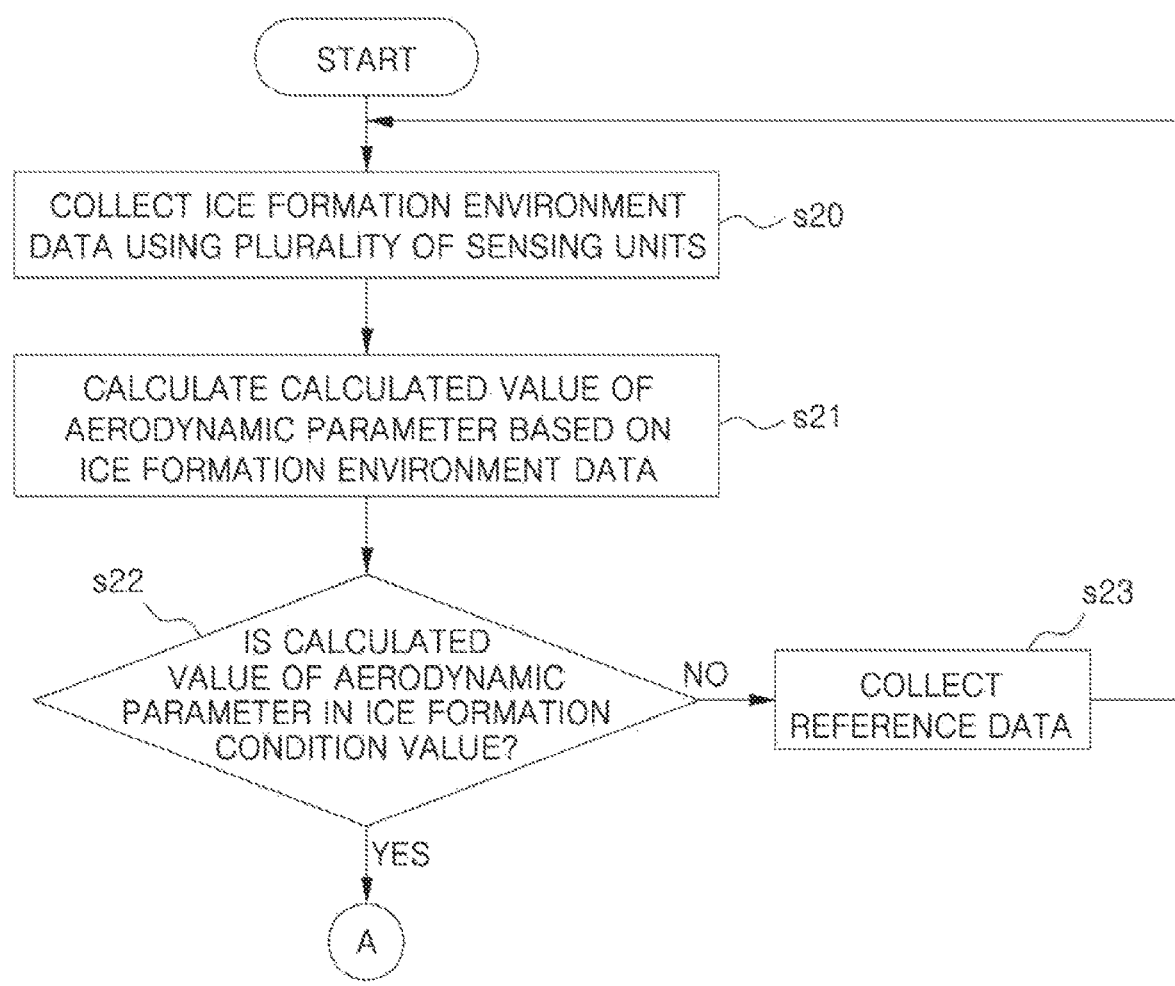
Figure 3:
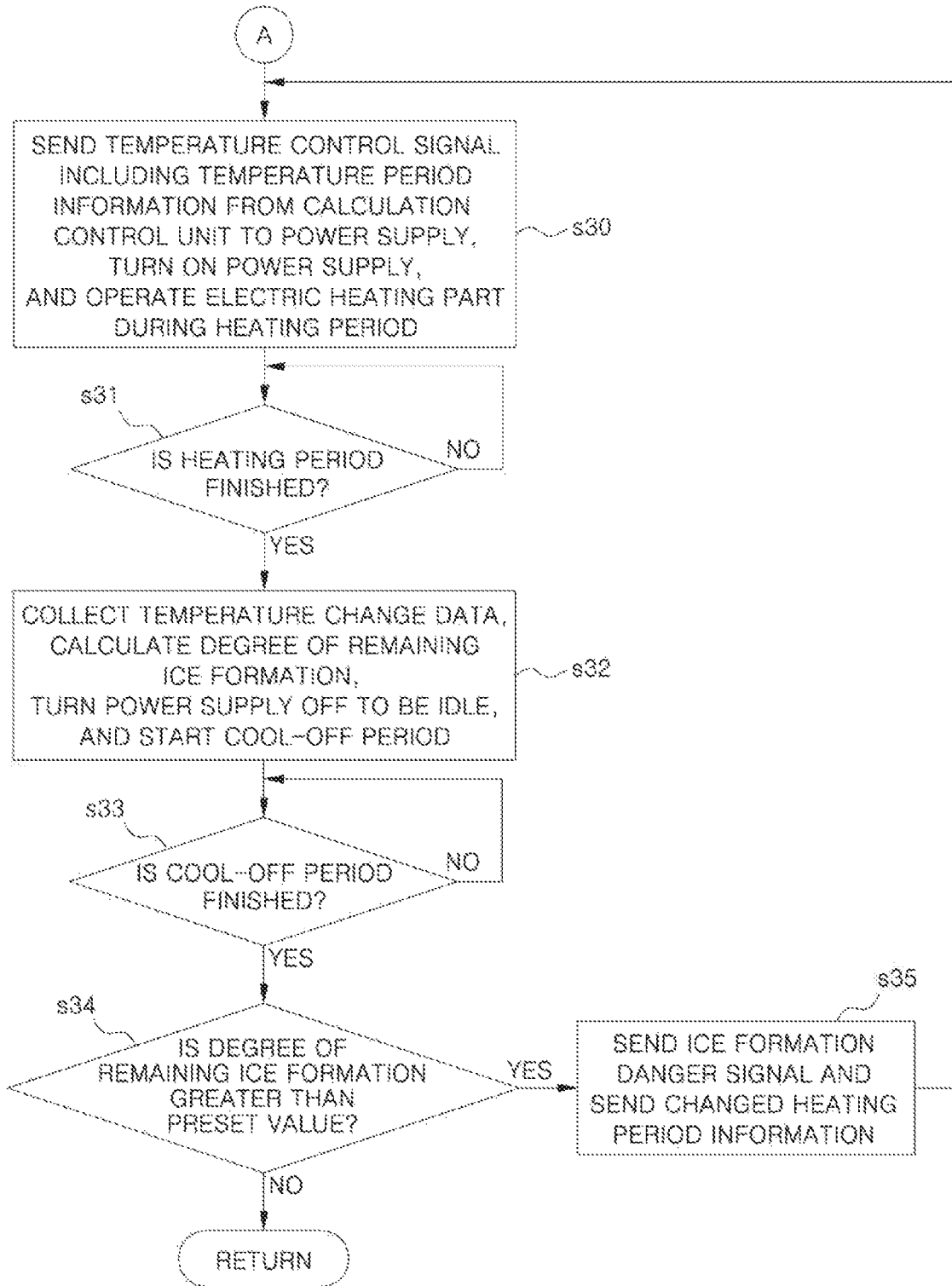
Figure 4:
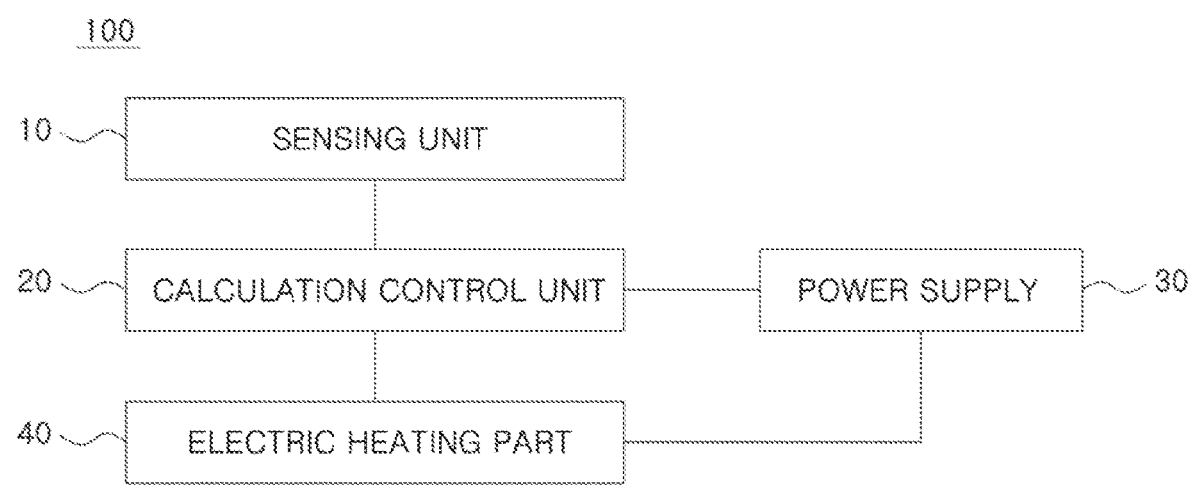
FIG. 4 is a block diagram showing an autonomous anti-icing apparatus according to one embodiment of the present invention.

FIGS. 1 to 3 are flowcharts showing a method of controlling an autonomous anti-icing apparatus according to one embodiment of the present invention, and FIG. 4 is a block diagram showing an autonomous anti-icing apparatus according to one embodiment of the present invention.

As shown in FIGS. 1 to 4, an autonomous anti-icing apparatus 100 according to one embodiment of the present invention includes sensing units 10, a calculation control unit 20, a power supply 30, and an electric heating part 40.

In this case, the autonomous anti-icing apparatus 100 may be understood as an apparatus provided in structures provided at various icing points such as a ship for frozen seas, an off-shore structure installed in a low temperature extreme environment, an airplane, a wing of an unmanned aerial vehicle, a blade of a wind power generator, an external wall or window of a high-rise building, or the like.

Further, the method of controlling the autonomous anti-icing apparatus according to one embodiment of the present invention may be understood as an algorithm that detects ice formation based on measurement data to autonomously prevent or remove ice formation. The method of controlling an autonomous anti-icing apparatus includes a dual redundant ice formation detection algorithm that is based on data measured by various sensors in real time while a ship or an airplane is driven. Further, the method of controlling an autonomous anti-icing apparatus may include an algorithm that is linked with an anti-icing system, such as a carbon nanotube heating element, to autonomously prevent or remove ice formation. In this case, the electric heating part 40 may be formed of an electric resistance heating element and may be formed of a composite material including carbon nanotubes to be heated when a current is applied to an electrode.

First, ice formation environment data including information on an air speed, an angular speed, an angle, and aerodynamic load for an ice formation environment is collected in real time through the plurality of sensing units 10 provided in the structure exposed to an ice formation environment. Further, ice formation prediction data including an aerodynamic coefficient is stored in the calculation control unit 20 (s10).

In this case, the sensing units 10 may include a pressure sensor, a pivot tube, an anemometer, and the like, which are disposed at a position of a surface or the inside of the structure at which the aerodynamic calculation is optimized, to measure the air speed in an ice formation environment and the like in real time.

Further, the ice formation environment data may include information on an angle between the structure and an air flow direction, a side slip angle, an angular speed, an aerodynamic load, an engine speed, and the like. In this case, the angle between the structure and the air flow direction, the angular speed, the aerodynamic load, the engine speed, and the like are measured or calculated in real time by the sensing units 10 including the pressure sensor, the pivot tube, the anemometer, and the like, and the ice formation environment data may be stored in the calculation control unit 20.

Further, the ice formation prediction data may include aerodynamic coefficient information that is statistically estimated and is difficult to measure with the sensing units 10. In this case, the aerodynamic coefficient may be calculated through a relational expression between a lift coefficient, a drag coefficient, and an angle of attack, wherein the lift coefficient and the drag coefficient may be pre-stored in the calculation control unit 20 to be extracted through a statistical model. In this case, the ice formation prediction data may be applied based on a statistical value pre-stored in the calculation control unit 20 and may be set to an alternative value, which is measurable by the sensing units 10, to be applied.

In this case, the ice formation environment data and the ice formation prediction data may be understood as data in which a change in the structure, such as a surface of an airframe wing, is collected and stored in real time. That is, the two pieces of data may detect a degree of ice formation of a kinematics and aerodynamic model-based ice formation detection algorithm of a dual redundant ice formation detection algorithm included in the autonomous anti-icing apparatus, wherein the kinematics and aerodynamic model-based ice formation detection algorithm is the first ice formation detection algorithm shown in FIG. 1.

Specifically, the ice formation environment data may include a measurement value such as air speed, an angular speed, a side slip angle, and the like. In this case, the air speed may be obtained by calculating a relative speed vector of air through an acceleration measurement value including an angular speed of air, a speed vector of the ground, a relative speed vector of air to earth, and a relative speed vector of the structure to the wind.

Further, an angle of attack with air flow and a side slip angle may be obtained through the relative speed vector of air. That is, the angle of attack with air flow and the side slip angle may be obtained through the acceleration measurement value including the angular speed of air, the speed vector of the ground, the relative speed vector of air to earth, and the relative speed vector of the structure to the wind that are described above. Since the parameters of the kinematic model of the structure are measured by the sensing units 10 in real time and calculated by the calculation control unit 20, the ice formation environment data for detecting a degree of ice formation of the structure may be collected and stored in real time.

Meanwhile, the ice formation environment data may include a measurement value such as aerodynamic load information, an acceleration measurement value, a gravitational constant, information on an angle between the structure and air, a mass of the structure, the aerodynamic load, a thrust load, and the like. In this case, the load vector of the structure may be calculated through the acceleration measurement value, the gravitational constant, the information on the angle between the structure and air, the mass of the structure, the aerodynamic load, and the thrust load.

In this case, a thrust load by an engine provided in the structure may be calculated through a density of air and an engine-propeller coefficient. Further, to detect a change in aerodynamic load in a horizontal and vertical direction, the aerodynamic load in the horizontal and vertical direction may be calculated through the aerodynamic coefficient obtained through the density of air, a square value of air speed, a surface area of a structure, a lift coefficient and a drag coefficient, and an angle of attack. In this case, the aerodynamic coefficient may be included in the ice formation prediction data.

Meanwhile, a calculated value of an aerodynamic parameter is calculated based on the ice formation environment data and the ice formation prediction data in real time to determine whether a surface of the structure is iced, and a degree of ice formation may be calculated through the calculated value of the aerodynamic parameter (s11).

First, the calculated value of the aerodynamic parameter may be calculated based on the ice formation environment data and the ice formation prediction data in real time. In this case, the calculated value of the aerodynamic parameter may be understood as a plurality of pieces of data calculated based on the ice formation environment data and the ice formation prediction data. In this case, the calculated value of the aerodynamic parameter may include a calculated value calculated by the following Equations 1 and 2.

$$f_x = \frac{1}{m}(F_{a_x}(V_a, C_x) + F_T(V_a, \omega_p)) \qquad \text{[Equation 1]}$$

In Equation 1, fx refers to an aerodynamic load in an x-axis direction of a coordinate system, m refers to a mass, Va refers to an air speed vector, Cx refers to a lift coefficient, and ωp refers to an angular speed, $$f_z = \frac{1}{m}F_{a_z}(V_a, C_z) \qquad \text{[Equation 2]}$$

In Equation 2, fz refers to an aerodynamic load in a z-axis direction of the coordinate system, m refers to a mass, $V_a$ refers to an air speed vector, and $C_z$ refers to a drag coefficient. Furthermore, the calculated value of aerodynamic parameter may include an angular speed, an air speed vector, a lift coefficient, and a drag coefficient. In this case, the air speed vector, the lift coefficient, and the drag coefficient may be understood as a vector.

Further, the degree of ice formation may be calculated through the calculated value of aerodynamic parameter. In this case, the degree of ice formation may be calculated by the following Equations 3 and 4.

$$r_1 = \frac{\rho}{2m}(V_a^2 S C_x + S_P C_P(k_p^2 \omega_p^2 - V_a^2)) - f_x \qquad \text{[Equation 3]}$$

In Equation 3, $r_1$ refers to a degree of ice formation in the x-axis direction of the coordinate system. Further, ρ refers to a density of air, in refers to a mass, $V_a$ refers to an air speed vector, S refers to a surface area of a structure, $C_x$ refers to a lift coefficient, $S_p$, $C_p$, and $k_p$ refer to an engine-propeller coefficient, $\omega_p$ refers to an angular speed, and f refers to an aerodynamic load in the x-axis direction of the coordinate system.

$$r_2 = \frac{\rho}{2m}V_a^2 S C_z - f_z, \qquad \text{[Equation 4]}$$

In Equation 4, $r_2$ refers to a degree of ice formation in a z-axis direction of the coordinate system, p refers to a density of air, m refers to a mass, $V_a$ refers to an air speed vector of air, S refers to a surface area of a structure, $C_z$ refers to a drag coefficient, and $f_z$ refers to an aerodynamic load in the z-axis direction of the coordinate system.

In this case, $r_1$ and $r_2$ refer to a degree of ice formation. $r_1=r_2=0$ means that no ice formation is detected on a surface of the structure, and $r_1=r_2\neq 0$ means that ice formation is detected on the structure. In this case, a degree of ice formation may be determined to correspond to values of the $r_1$ and $r_2$.

Therefore, the aerodynamic parameter is calculated based on the ice formation environment data and the ice formation prediction data that are collected and stored based on a kinematic and aerodynamic model in real time, and the degree of ice formation of the structure may be determined in real time. Therefore, the speed and accuracy of ice formation detection can be improved.

Further, when ice formation is determined to be present by comparing the degree of ice formation with a predetermined value (s12), that is, the degree of ice formation is not 0, the calculation control unit 20 sends a temperature control signal, which includes a heating period signal, to the power supply 30 so that the electric heating part 40 is heated (s30). In this case, when the degree of ice formation is 0, it is determined that ice formation is not present. In some cases, even when a calculated value, which is finely and substantially close to 0 in decimal units, is provided, it may be determined that ice formation is not present.

On the other hand, when it is determined that ice formation is not present by comparing the degree of ice formation with the predetermined value, the sensing units 10 may collect reference data in an ice non-formation environment for detecting formation (s13). For example, the ice formation environment data and the ice formation prediction data collected when the degrees of ice formation $r_1$ and $r_2$ are 0 are stored in the calculation control unit 20, and the data may be sent to a monitor (not shown) separately provided in a ship or an air plane. Further, when the reference data is collected, the ice formation environment data is collected by the sensing units 10 in real time, and the operation returns to the operation s10 in which the ice formation prediction data is stored.

Meanwhile, an electro-thermal based ice formation detection algorithm of the dual redundant ice formation detection algorithms, which are included in the autonomous anti-icing apparatus, may be linked with the kinematic and aerodynamic model-based ice formation detection algorithm in parallel, wherein the electro-thermal based ice formation detection algorithm is the second ice formation detection algorithm shown in FIGS. 2 and 3, and the kinematic and aerodynamic model-based ice formation detection algorithm is the first ice formation detection algorithm shown in FIG. 1. The electro-thermal based ice formation detection algorithm calculates a calculated value of a thermodynamic parameter based on the atmospheric condition and the structure, such as a thermodynamic system around the electric heating part 40, an airframe wing, and the like, to detect ice formation.

First, the ice formation environment data including atmospheric temperature data is collected by a plurality of sensing units 10 in real time (s20). In this case, the ice formation environment data may include temperature change data of the electric heating part 40 and atmospheric temperature data of the structure that are collected by the sensing units 10 in real time. Further, the sensing units 10 may include a temperature sensor, an atmospheric sensor, and the like, which are disposed on a surface of the structure or in the structure, to measure an atmospheric temperature in an ice formation environment, a temperature of the electric heating part 40, and the like in real time.

Further, the calculated value of the thermodynamic parameter is calculated based on the ice formation environment data including the atmospheric temperature data in real time to determine whether the structure is iced (s21). In this case, the electro-thermal based ice formation detection algorithm may be formed of various elements, such as thermodynamic ice formation condition change evaluations, sensors, active elements, major thermodynamic equations applied to the algorithm, and the like. Further, the calculated value of the thermodynamic parameter may be collected and stored through measurement and calculation of a thermal energy change for detecting ice formation accretion. In this case, in an ice non-formation state, the calculated value of the thermodynamic parameter in the structure may be calculated through a wing of the structure, the electric heating part 40, a water layer, and air flow around the structure. Meanwhile, in an ice formation state, a change element of a thermal energy flow may be further considered in the calculated value of the thermodynamic parameter.

Further, the temperature sensor may be embedded in the electric heating part 40 so that data for a temperature change due to heating of the electric heating part 40 in the structure is collected. Further, the temperature sensor may include sensor bids that are connected by a wire in the structure to be exposed to a surface of the structure.

A basic thermodynamic equation in an ice formation environment is applied with the first law of thermodynamics (the law of conservation of energy) as an aggregate of elements that compose thermal energy. The elements that compose the thermodynamic model are classified into a structure of the structure, the electric heating part 40, and the ice formation environment conditions and are applied to maintain thermodynamic equilibrium of the thermodynamic system. In this case, the thermodynamic equation is expressed by the following Equation 5 by the law of conservation of energy.

$$Q_c+Q_d+Q_e+Q_s=Q_a+Q_k+Q_l \quad \text{[Equation 5]}$$

In equation 5, $Q_c$ refers to thermal energy related to heat convection, $Q_d$ refers to thermal energy released by water droplets, $Q_e$ refers to thermal energy related to evaporation, and $Q_s$ refers to thermal energy due to sublimation of ice. Further, $Q_a$ refers to thermal energy related to surface frictional heat due to aerodynamic heating, $Q_k$ refers to thermal energy equivalent to kinetic energy generated when water droplets collide with a surface of the structure, and $Q_l$ refers to thermal energy by the latent heat of solidification.

Specifically, the thermal energy $Q_c$ consumed by heat convection may be calculated by multiplying a convective heat transfer coefficient by a temperature of free flowing air around the structure which is subtracted from the temperature measured by the electric heating part 40.

Further, thermal energy $Q_d$ consumed by release of water droplets which drop on a surface of the structure or vapor may be calculated by multiplying a density and flow speed of free flowing air by a specific heat coefficient of water and by local collection efficiency. In this case, the local collection efficiency may be calculated by dividing a distance between droplets in the air by a distance between droplets that collide with the surface of the structure.

Further, thermal energy $Q_e$ related to evaporation may be calculated by multiplying the evaporation factor by a saturation vapor pressure subtracted from a coefficient by a change in a temperature of the electric heating part 40.

Further, the thermal energy $Q_s$ in sublimation, which occurs when a phase of ice is changed, may be calculated by multiplying a sublimation factor by a temperature of free flowing air around the structure from the temperature measured by the electric heating part 40. In this case, the sublimation factor may be calculated by dividing the product of the evaporation factor and a sublimation latent heat constant by an evaporation latent heat constant.

Further, the thermal energy $Q_a$, which is obtained by aerodynamic heating, refers to heat due to skin friction obtained when the structure passes through air and depends on a viscosity and speed of air. In this case, the thermal energy $Q_a$ due to the aerodynamic heating may be calculated by a relational expression of a convective heat transfer coefficient, an adiabatic recovery factor, and an air speed.

The thermal energy $Q_k$ equivalent to kinetic energy generated when liquid water particles collide with a surface of the structure may be calculated by a relational expression of a liquid water content of the free flowing air, which is included in an air flow, and an air speed.

The thermal energy $Q_l$ by latent heat of solidification may be calculated by a relational expression of a density of ice, a latent heat of fusion constant, and a change in ice formation thickness according to time. The thermodynamic model may be calculated in consideration of a compressible flow and an effect of transfer through an ice and water layer. That is, when an one-dimensional Fourier's law is applied to the thermodynamic model including a dissipative element considering a transfer effect in which heat is transferred from the electric heating part 40 to the structure, the thermodynamic model may be expressed as the following Equation 6.

$$Q_y=-k(T_{ETS}-T_\infty) \quad \text{[Equation 6]}$$

In Equation 6, $Q_y$ refers to a calculated value of a thermodynamic parameter, and k refers to a constant calculated through a relational expression of fog volume in the free-flowing air, collection efficiency of water droplets that drop on the structure, an air speed, and a specific heat capacity of water. Further, $T_{ETS}$ refers to a temperature measured by the electric heating part 40, that is, temperature change data, and $T_\infty$ refers to atmospheric temperature data in the free flowing air.

Further, the calculated value of thermodynamic parameter is compared and determined whether the calculated value of thermodynamic parameter is included in an ice formation condition value (s22). In this case, the calculated value of the thermodynamic parameter may be understood as data calculated based on the ice formation environment data. In some cases, the calculated value of the thermodynamic parameter may be provided by a relational expression of thermal energy calculated value discharged when water droplets in the air solidify to ice, a temperature value of the structure, and a temperature value of the free flowing air around the structure.

In this case, when, since the calculated value of the thermodynamic parameter is included in an ice formation condition value, it is determined that ice formation is present, the calculation control unit 20 sends a temperature control signal including a heating period signal to the power supply 30 so that the electric heating part 40 is heated (s30). In some cases, vapor around the structure may be detected by a simple method. Meanwhile, when a temperature of a surface of the structure is less than 0° C., the calculated value of the thermodynamic parameter including a temperature value of a surface of the structure is included in an ice formation condition value pre-stored in the calculation control unit 20, and thus it may be determined that ice formation is present.

Meanwhile, when the calculated value of the thermodynamic parameter is not included in an ice formation condition value, the sensing units 10 may collect reference data in an ice non formation environment for detecting ice formation (s23). For example, when the calculated value of the thermodynamic parameter is not included in an ice formation condition value, the collected ice formation environment data and the ice formation prediction data are stored in the calculation control unit 20. Further, the data may be sent to a monitor of a ship or an airplane in which the data is separately provided. Further, when the reference data is collected, the ice formation environment data may be collected by the sensing units 10 in real time, and the operation returns to the operation s10 of storing the ice formation prediction data.

Therefore, the thermodynamic parameter is calculated based on the ice formation environment data, which is collected based on the electro-thermal based ice formation detection algorithm in real time, and an ice formation condition of the structure is determined in real time, and thus the speed and accuracy of ice formation detection can be improved.

Further, a degree of ice formation and a degree of remaining ice formation are calculated through a parallel dual redundant ice formation detection algorithm of the electro-thermal based ice formation detection algorithm and the kinematic and aerodynamic model-based ice formation detection algorithm based on the ice formation environment data and the ice formation prediction data that are collected and calculated in real time. Therefore, since deduction of an ice formation detection result which is different from an actual environment is prevented according to a temporary situation, accuracy and robustness can be improved.

Meanwhile, when it is determined that ice formation is present, the calculation control unit 20 sends a temperature control signal, which includes a heating period signal, to the power supply 30 so that the electric heating part 40 is heated (s30). In this case, presence of ice formation may be determined by at least one algorithm of the electro-thermal based ice formation detection algorithm and the kinematic and aerodynamic model-based ice formation detection algorithm.

In this case, the electro-thermal based ice formation detection algorithm and the kinematic and aerodynamic model-based ice formation detection algorithm are an algorithm that detects ice formation in various methods and are formed to separately detect ice formation in parallel.

In this case, when ice formation is detected in the electro-thermal based ice formation detection algorithm and the kinematic and the aerodynamic model-based ice formation detection algorithm, the calculation control unit 20 may send a temperature control signal, which includes a heating period signal, to the power supply 30. That is, the above-described ice formation detection condition refers to a case in which the degree of ice formation is greater than a preset value and the calculated value of the thermodynamic parameter is included in an ice formation condition value.

Therefore, although temporary extreme data is collected in any one of the above-described two algorithms so that it is determined that ice formation is detected differently from an actual environment, when ice formation is not detected in the other algorithm, the one algorithm conflicts with the other algorithm, and thus the temperature control signal may not be sent. Therefore, only when the two algorithms are satisfied with an ice formation detection condition, that is, a condition in which the degree of ice formation is greater than a preset value and the calculated value of the thermodynamic parameter is included in the ice formation condition value, the temperature control signal may be sent.

In some cases, ice formation may be detected with only one algorithm of the two algorithms. That is, since the two algorithms are formed independently to separately detect ice formation, even when only one algorithm of the two algorithms is used, ice formation may be detected. Therefore, due to collision with an external object, even in an emergency situation in which one of the two algorithms is not used, the other one of the two algorithms is operable, and thus stability can be improved.

Further, when a temperature control signal, which includes a heating period signal, is sent to the power supply 30, the power supply 30 is turned on, and the heating period of the electric heating part 40 is set, and thus the electric heating part 40 may be heated during a preset heating period (s30). Therefore, the electric heating part 40 provided in the structure is heated during the preset heating period, and thus ice formation on a surface of the structure may be prevented or removed.

In this case, the power supply 30 may be converted to an on-state or an idle-off state so that the electric heating part 40 is selectively operated. In this case, when the power supply 30 is turned on, the electric heating part 40 is heated during a preset heating period. When the power supply 30 is turned off, heating of the electric heating part 40 may be stopped.

The electric heating part 40 is heated during a preset heating period and continuously determines when the preset heating period is finished until the heating period is finished (s31).

Further, when the heating period of the electric heating part 40 is finished, temperature change data of the electric heating part 40 is collected by the sensing units 10. Further, the degree of remaining ice formation on a surface of the structure is calculated through the temperature change data collected during the heating period, the power supply 30 is turned off to be idle, and a cool-off period of the power supply 30 starts (s32). The electric heating part 40 is cooled off during a preset heating period and continuously determines when the preset cool-off period is finished until the cool-off period is finished (s33).

In this case, the temperature change data may be understood as a value required to calculate the degree of remaining ice formation. Further, the degree of remaining ice formation may be expressed as the following Equation 7.

$$r = \Delta T_o e^{-t/\tau} - \Delta T(t) \qquad \text{[Equation 7]}$$

In Equation 7, r refers to a degree of remaining ice formation. In this case, a case in which the degree of remaining ice formation is 0 (r=0) means a state in which no ice formation is detected on a surface of the structure. A case in which the degree of remaining ice formation is not 0 (r≠0) means that a state in which ice formation is detected on the structure. Further, $T_O$ refers to a difference between the temperature data measured by the electric heating part 40 and atmospheric temperature data in the free air, t means a heating period, and T(t) means a temperature value of the structure according to a heating period change. Further, τ may be calculated by the following Equation 8.

$$\tau = \frac{1}{t_2 - t_1} \int_{t_1}^{t_2} \frac{-\theta}{\ln(\Delta T(\theta)) - \ln(\Delta T_o)} d\theta \quad \text{[Equation 8]}$$

In Equation 8, $T_2-T_1$ means a heating period. That is, $t^1$ means a time of the starting point of the heating period, and $t_2$ means a time of the end point of the heating period. In this case, τ may be understood as a variable value calculated by a relational expression with the heating period.

Further, when the degree of remaining ice formation is greater than a preset value (s34), that is, when a calculated value of the degree of remaining ice formation is not 0, an ice formation danger signal is sent from the calculation control unit 20 so that the heating period is reset (s35). In this case, although the degree of remaining ice formation is calculated to be a negative value rather than 0, it may be determined that ice formation is present. Therefore, when the heating period signal, which is reset to a period corresponding to the degree of remaining ice formation, is sent, the power supply 30 is turned on. Further, a heating period of the electric heating part 40 is reset, and the electric heating part 40 may be heated during a preset heating period. In this case, a case in which the degree of remaining ice formation is not 0 (r≠0) means a state in which ice formation is detected on the structure, and thus the degree of remaining ice formation may be determined to correspond to the degree of remaining ice formation.

Further, when the ice formation danger signal is sent from the calculation control unit 20, the ice formation danger signal is shown on a monitor (not shown) separately provided in a ship or an airplane, and thus an operator may confirm an ice formation danger state. Therefore, to remove ice formation on a surface of the structure, the electric heating part 40 may be manually operated by the operator.

On the other hand, when the degree of remaining ice formation corresponds to a preset value s34), the operation returns to the start, and thus each of the algorithms is repeated. In this case, when the degree of remaining ice formation is 0, it is determined that ice formation is not present. In some cases, even when a calculated value, which is finely and substantially close to 0 in decimal units, is provided, it may be determined ice formation is not present.

Therefore, when ice formation is detected on the structure, the electric heating part 40 is heated during a preset heating period so that ice formation is prevented or removed, and thus the operational performance of a ship or an airplane in an ice formation environment can be improved.

Further, only when ice formation is detected, the electric heating part 40 is operated, and thus power consumption can be reduced, and economic feasibility can be improved.

Further, during the preset heating period, whenever the electric heating part 40 is heated, the degree of remaining ice formation is calculated, and the heating period is reset to correspond to remaining ice formation on a surface of the structure. Therefore, since the electric heating part 40 is repeatedly heated according to the heating period, the efficiency of ice formation prevention and ice formation removal can be improved, and thus the operational performance of a ship or an airplane can be improved.

Through the above solution, the method of controlling the autonomous anti-icing apparatus of the present invention will provide the following effects.

First, the degree of ice formation and the degree of remaining ice formation are calculated through a parallel dual redundant ice formation detection algorithm, which is based on an electro-thermal and aerodynamic model, based on the real-time collected ice formation environment data. Therefore, since deduction of an ice formation result which is different from an actual environment is prevented according to a temporary extreme situation, accuracy and robustness can be remarkably improved.

Second, only when ice formation is detected on a structure based on the ice formation environment data that is collected by the sensing units in real time, an electric heating part is heated during a preset heating period, and thus ice formation can be prevented or removed. Therefore, power consumption required for heating of the electric heating part can be reduced, and economic feasibility can be improved.

Third, during the preset heating period, whenever the electric heating part is heated, the degree of remaining ice formation is calculated, and the heating period is reset to correspond to remaining ice formation on a surface of the structure so that the electric heating part is repeatedly heated. Therefore, the efficiency of ice formation prevention and ice formation removal can be improved, and the operational performance of a ship or an airplane can be improved.

Fourth, when aerodynamic parameters are calculated based on the ice formation environment data and the ice formation prediction data which are collected and stored based on a kinematic and aerodynamic model in real time, a degree of ice formation of a structure is determined in real time, and thus the speed and accuracy of ice formation can be improved.

As described above, the present invention is not limited to the above described embodiments. It should be understood that various modifications can be made within the technical scope of the present invention by a person having ordinary skill in the art to which the present invent pertains, and the modification will be within the scope of the present invention.

What is claimed is:

1. A method of controlling an autonomous anti-icing apparatus provided in a structure in an ice formation environment, the method comprising:
   a first step of collecting and storing ice formation environment data, which includes information on an air speed, an angular speed, an angle, and aerodynamic load for an ice formation environment, using a plurality of first sensors, which are provided in the structure, in real time and storing ice formation prediction data including an aerodynamic coefficient;
   a second step of calculating a calculated value of aerodynamic parameter based on the ice formation environment data and the ice formation prediction data in real time so as to determine whether ice formation is present on a surface of the structure and calculating a degree of ice formation through the calculated value of an aerodynamic parameter; and
   a third step of allowing a calculation control unit to send a temperature control signal, which includes a heating period signal, to a power supply so that an electric heating part is heated when the ice formation is determined by comparing the degree of ice formation with a preset values wherein, the third step includes:
sending a heating period signal from the calculation control unit to the power supply when a heating period of the electric heating part is set;
collecting temperature change data of the electric heating part by a plurality of second sensors when the heating period of the electric heating part is finished, sending an off-control signal to the power supply, and starting a cool-off period; and
calculating a degree of remaining ice formation on the surface of the structure based on the temperature change data collected during the heating period.

2. The method of claim 1, wherein, in the third step, the degree of remaining ice formation is calculated by $r=\Delta T_o e^{-t/\tau} - \Delta T(t)$, wherein r refers to a degree of remaining ice formation, $T_0$ is a difference between temperature data, which is measured in the electric heating part, and atmospheric temperature data in free air, t refers to a heating period, τ refers to a variable value calculated by a relational expression with the heating period, and T(t) refers to a temperature value of a structure according to a change in the heating period, and the third step includes, when the degree of remaining ice formation is greater than a preset value, sending an ice formation danger signal from the calculation control unit so that a heating period is reset.

3. The method of claim 1, wherein the degree of ice formation in the second step is calculated by $$r_1 = \frac{\rho}{2m}(V_a^2 S C_x + S_P C_P(k_p^2 \omega_p^2 - V_a^2)) - f_x \text{ and,}$$

$$r_2 = \frac{\rho}{2m} V_a^2 S C_z - f_z,$$

wherein $r_1$ refers to a degree of ice formation in an x-axis direction of a coordinate system, ρ refers to a density of air, m refers to a mass, $V_a$ refers to an air speed vector value, S refers to a surface area of a structure, $C_X$ refers to a lift coefficient, $S_p$, $C_p$, and $k_p$ refer to an engine-propeller coefficient, $\omega_p$ refers to an angular speed value, $f_x$ refers to an aerodynamic load in an x-axis direction of the coordinate system, $r_2$ refers to a degree of ice formation in a z-axis direction of the coordinate system, $C_z$ refers to a drag coefficient, and $f_z$ refers to an aerodynamic load in a z-axis direction of the coordinate system.

4. The method of claim 1, wherein, in the first step, the ice formation environment data includes data for an atmospheric temperature of the structure and data for change in a temperature of the electric heating part that are collected by the plurality of second sensors in real time, the second step includes calculating a calculated value of thermodynamic parameter based on the ice formation environment data in real time, the third step includes comparing and determining whether the calculated value of the thermodynamic parameter is included in an ice formation condition value, and when the calculated value of the thermodynamic parameter is less than the ice formation condition value, collecting reference data for an ice non-formation environment by the plurality of first sensors.

* * * * *